March 23, 1971 C. E. McELDERRY 3,572,410
DEVICE FOR DELIMBING AND CUTTING A FELLED TREE
Filed Dec. 4, 1968 6 Sheets-Sheet 3

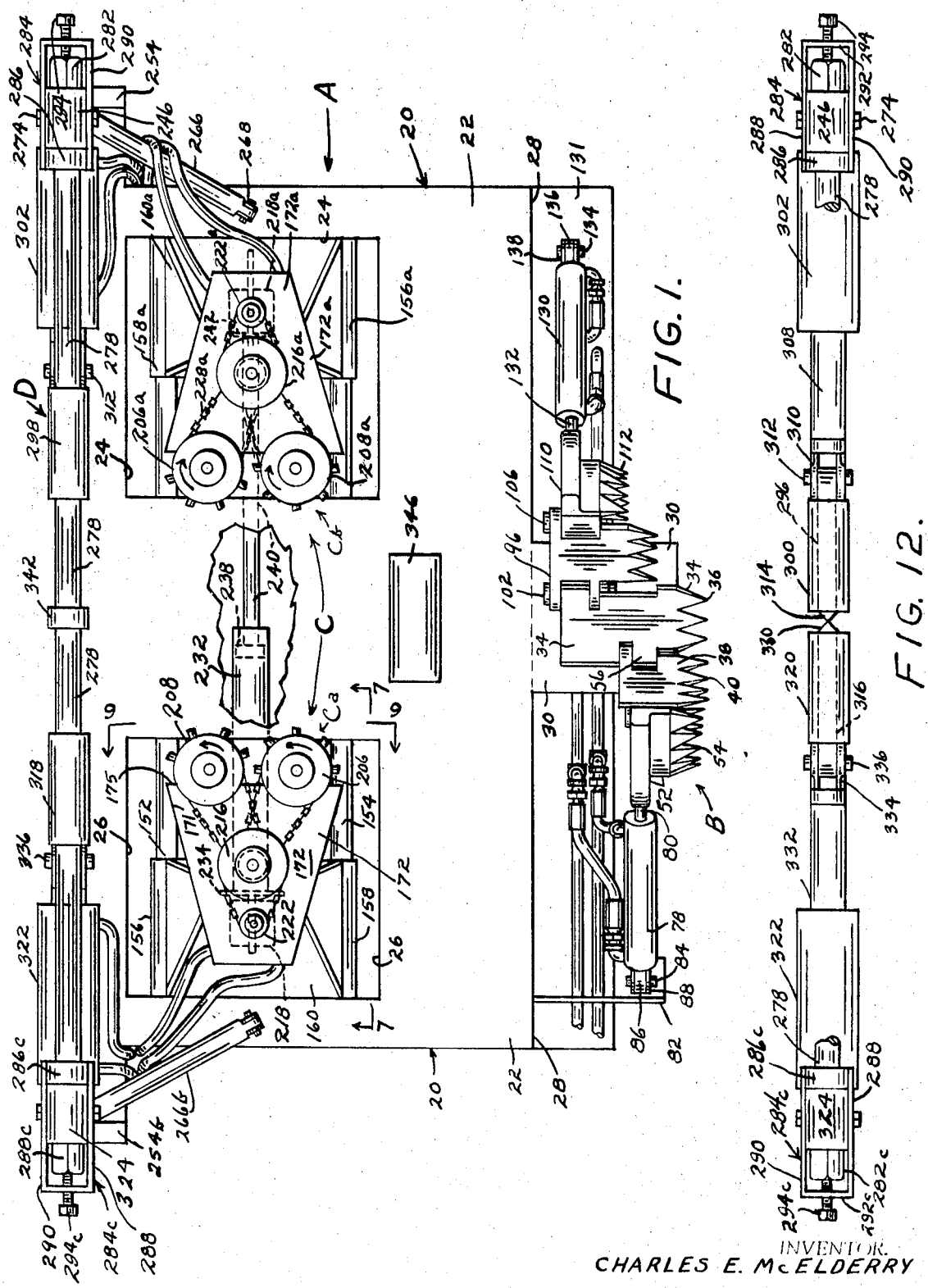

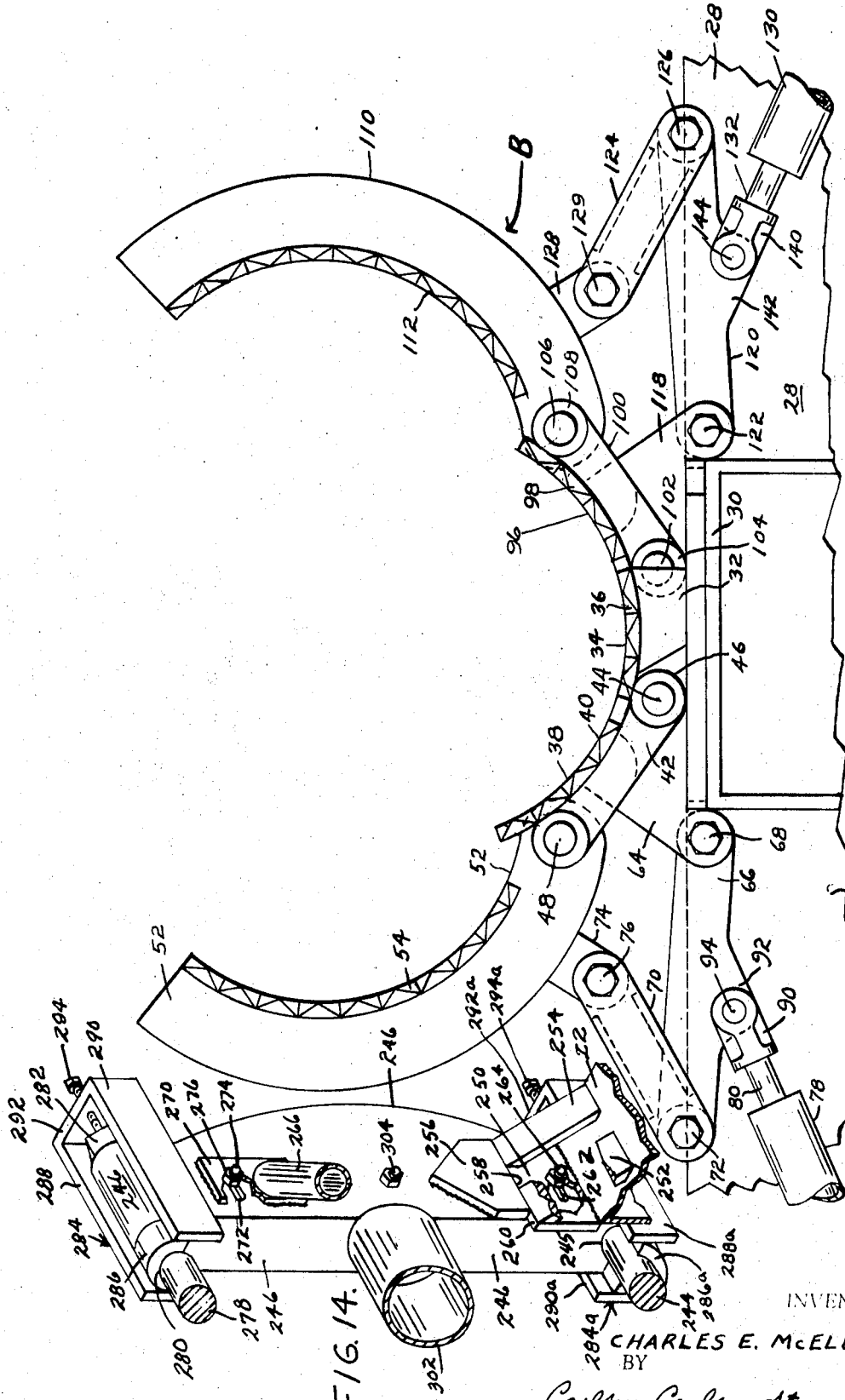

INVENTOR.
CHARLES E. McELDERRY
BY
Carlsen, Carlsen, Sturm & Hicks
ATTORNEYS

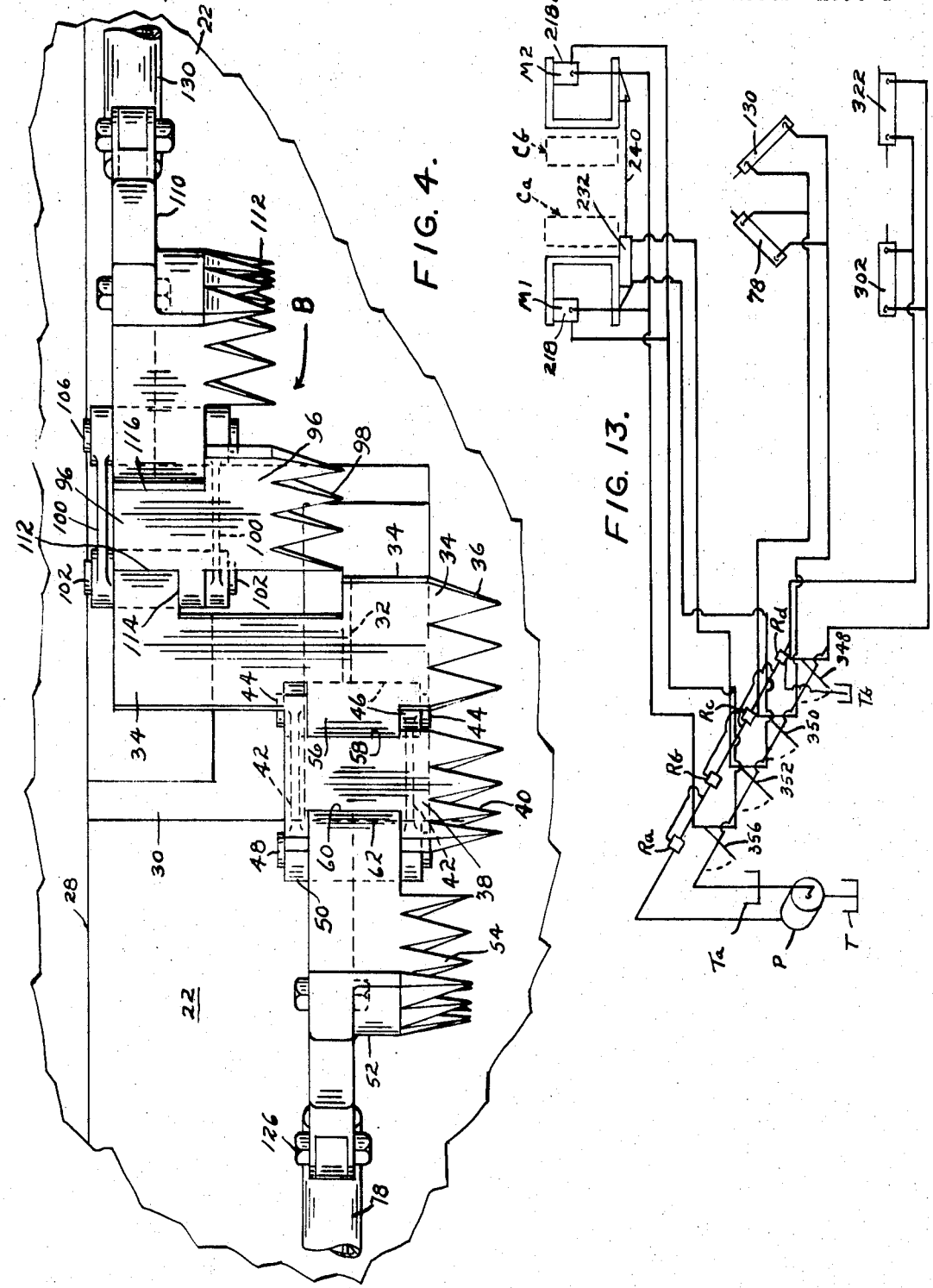

March 23, 1971 C. E. McELDERRY 3,572,410
DEVICE FOR DELIMBING AND CUTTING A FELLED TREE
Filed Dec. 4, 1968 6 Sheets-Sheet 5

INVENTOR.
CHARLES E. McELDERRY
BY
Carlsen, Carlsen, Sturm & Wicks
ATTORNEYS

March 23, 1971 C. E. McELDERRY 3,572,410
DEVICE FOR DELIMBING AND CUTTING A FELLED TREE
Filed Dec. 4, 1968 6 Sheets-Sheet 6
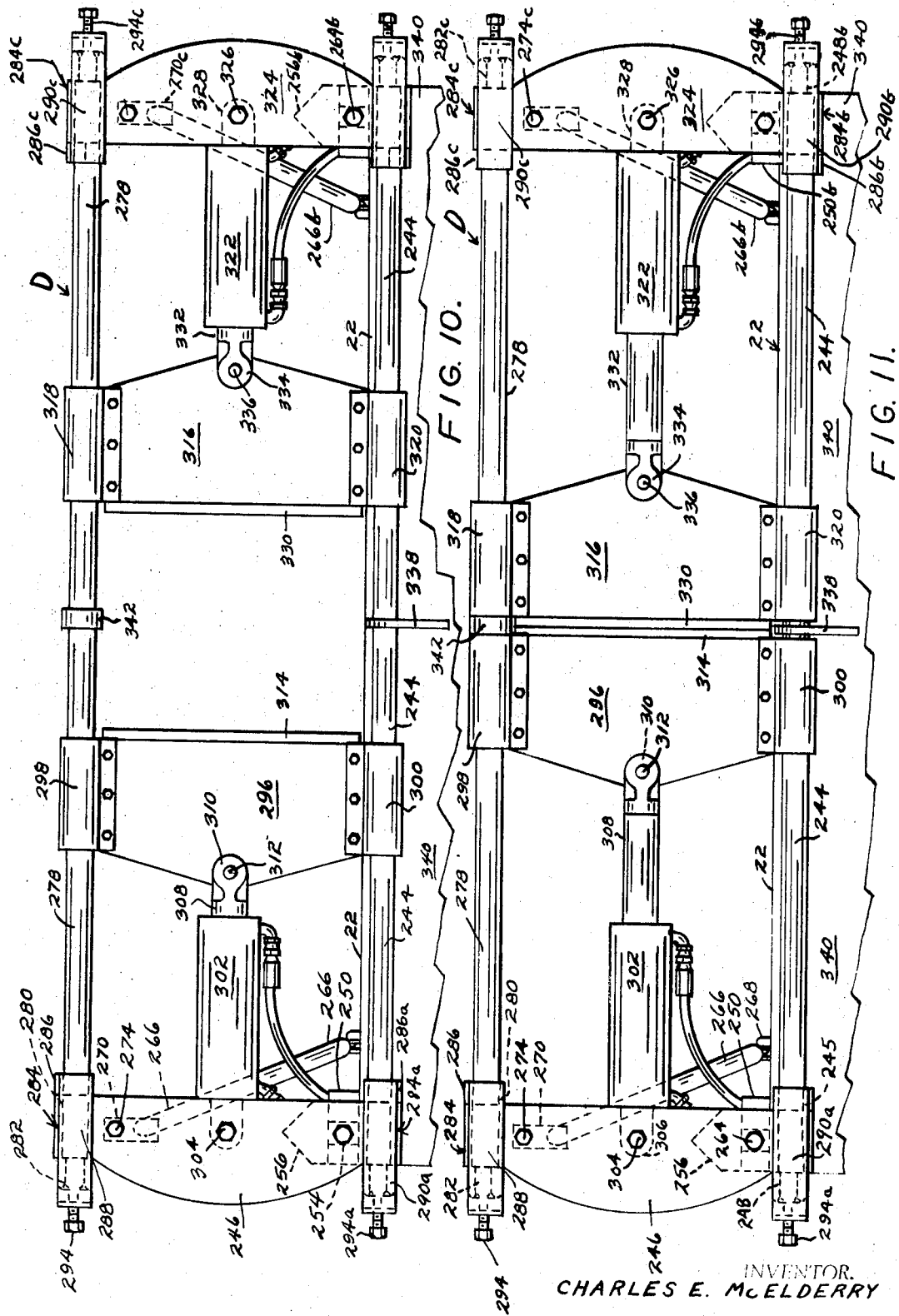
INVENTOR.
CHARLES E. McELDERRY
BY
Carlsen, Carlsen, Sturm & Hicks
ATTORNEYS

United States Patent Office 3,572,410
Patented Mar. 23, 1971

3,572,410
DEVICE FOR DELIMBING AND CUTTING A FELLED TREE
Charles E. McElderry, % Mack Welding Company, Inc., 9206 Grand Ave. Place, Duluth, Minn. 55808
Filed Dec. 4, 1968, Ser. No. 781,148
Int. Cl. A01g 23/02
U.S. Cl. 144—3                 7 Claims

ABSTRACT OF THE DISCLOSURE

A support means, a tree delimber unit having articulated arcuate limb cutting blades for placement about a felled tree, a pair of tree cutting blades in alignment with the articulated blades together with gripping rollers positioned on the support means intermediate of and in alignment with the articulated limb cutting blades and the tree cutting blades for gripping and moving a felled tree through said limb cutting blades and to the tree cutting blades.

SUMMARY OF THE INVENTION

The invention relates to devices for delimbing and cutting felled trees into desired lengths such as pulp wood size which in some areas is 100 inches in length. It is an object of the invention to provide a device which has a pair of tree gripping and moving rollers positioned intermediate of a tree delimbing unit and a tree shearing or cutting unit whereby the single set of tree moving rollers draws the tree through the delimbing unit and simultaneously moves it to the tree cutting unit for cutting into the desired length.

It is an additional object of the invention to provide a tree delimbing unit having a set of articulated knives or cutting blades which are positioned about a felled tree for delimbing the same as the tree is drawn through the blades, the blades following any irregularity in the contour of the tree and conforming to a decrease in diameter of the tree.

It is also an object of the invention to provide a single means for drawing the tree through the delimber and at the same time moving it to shear blades for cutting into the desired length, the means including a first pair of rotatable gripper rollers and a second pair of rotatable gripper rollers spaced therefrom which are brought toward each other and upon a tree under pressure.

Each pair of gripper rollers is slidable and pivotable upon the base frame whereby the gripper rollers accommodate and follow any inequalities in a tree as the rollers move the tree between the same. The pairs of gripper rollers are moved to and from each other by a single hydraulic cylinder which movement of the cylinders may be accomplished at the same time as the two pairs of rollers slidably move upon a main support.

It is a still further object to provide a shear blade mechanism which includes a pair of blades slidably mounted on a pair of parallel shafts, the blades brought together to cut the tree. This construction provides and allows continuous parallel alignment of the blades.

These and other more detailed and specific objects will be disclosed in the course of the following specification, reference being had to the accompanying drawings, in which:

FIG. 1 is a top plan view of a device for delimbing and cutting felled trees into desired lengths embodying the invention, a portion of the view being broken away.

FIG. 2 is an outer end view of the delimber in fully open position.

FIG. 4 is a top plan view of the delimber in an open position.

FIG. 10 is a front elevational view of the shear unit viewed from the outer side and in open position with only a portion of the platform being shown.

FIG. 11 is a view similar to FIG. 10 but with the shear unit in closed cutting position.

FIG. 12 is a top plan of the shear in closed position with part of the top rail shaft broken away, the remainder of the device not shown.

FIG. 13 is a schematic view of the hydraulic system of the device.

FIG. 14 is a fragmentary perspective view of one of the supports for the shear blade unit, portions of which are broken away.

Figure 5:
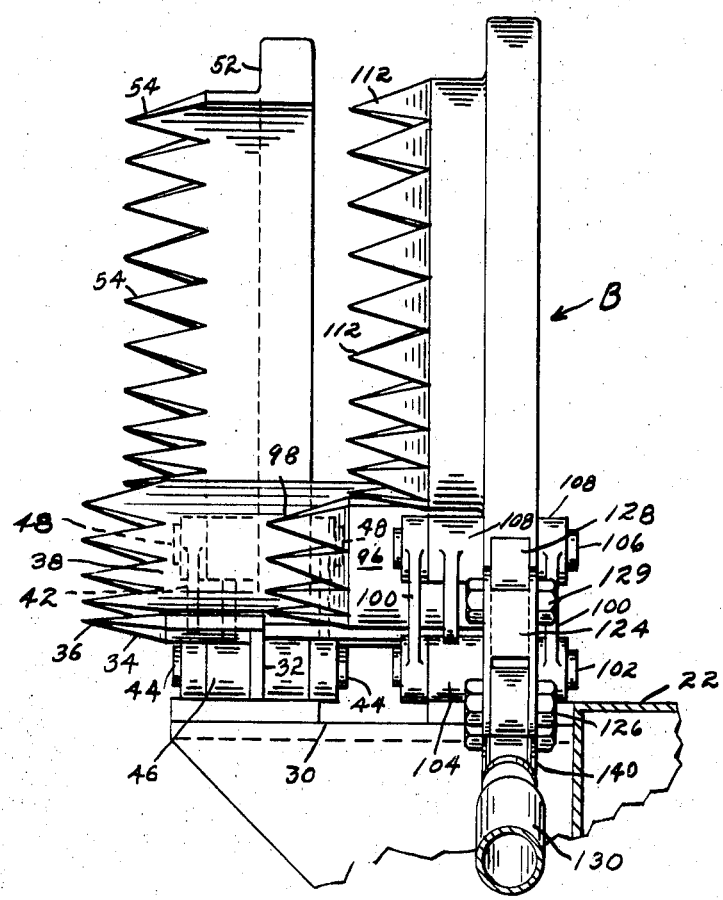
FIG. 5 is a side view of the delimber in an open position.

Referring to the drawings in detail, the device A for delimbing and cutting felled trees into desired lengths includes the main support 20. The support 20 includes the flat horizontal platform 22 formed with the spaced rectangular openings 24 and 26 and the apron 28 which depends from and extends along one side of the base. Secured to and extending from the apron 28 is the platform 30. The main support 20 may be mounted on various types of transport equipment such as a tractor, trailer truck or similar equipment to make the device mobile.

DELIMBER

Figure 3:
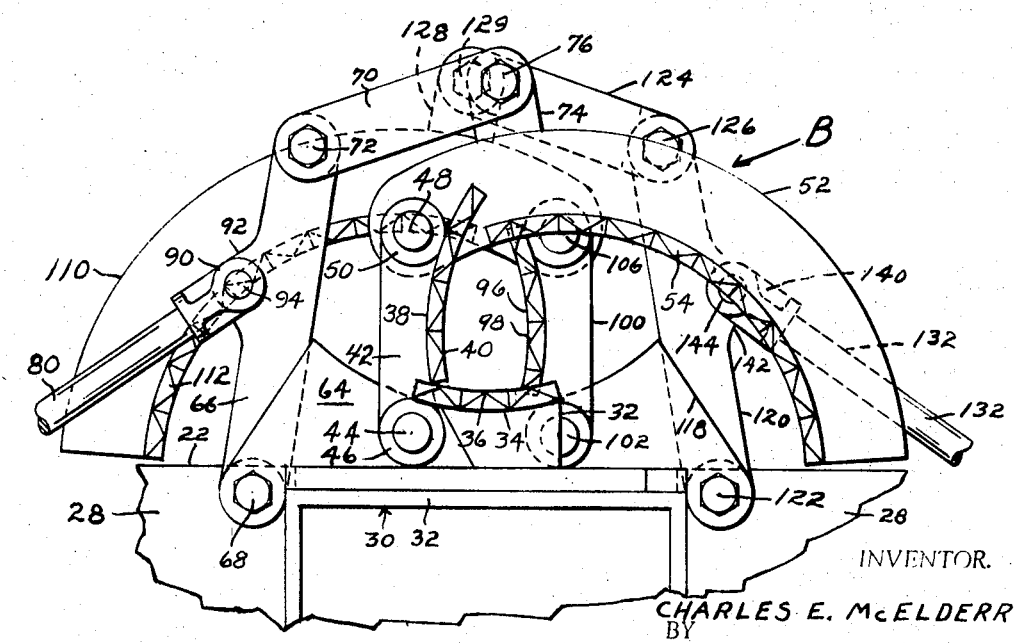
FIG. 3 is an outer end view of the delimber in a fully closed position.

The delimber portion B of the device (FIGS. 1–5) includes the transverse support 32 mounted on the platform 30 and secured to the top edge of the support 32 is the central arcuate stationary knife 34 which is substantially rectangular in outline with the cutting teeth 36 formed on the outer edge. Further provided is the first intermediate arcuate pivotal knife 38 which is substantially rectangular in outline with the cutting teeth 40. Affixed to the underside of the knife 38 is a pair of spaced supports 42 and mounted on the lower ends of the supports is the pin 44. The pin 44 is mounted in the bearing 46 secured to the platform 30. The upper ends of the supports 42 mount the pin 48, and the pin 48 is mounted in the bearing portion 50 mounted on the lower end of the first upper arcuate knife 52 to thereby pivotally mount the knife along its inner edge. The knife 52 has mounted on the outer edge thereof the teeth 54. The central knife 34 has formed on the side edge adjacent the knife 38 the protrusion 56 which fits into the notch 58 formed in the inner end of the first intermediate knife 38 to form a hinge-like connection. The outer end of the intermediate knife 38 is formed with the notch 60 in which the protrusion 62 fits which is formed on the inner end of the first upper knife 52 thereby forming a hinge-like connection.

Secured to the bearing 46 and platform 30 and extending therefrom is the stationary pivot mount 64. The numeral 66 designates a first main toggle arm pivoted at its lower end to the mount 64 by means of the pin 68 and at its upper end to the lower end of the secondary toggle arm 70 by means of the pin 72. The upper end of the secondary toggle arm 70 is pivotally connected to the boss 74 of the upper arcuate knife 52 by means of the pin 76. Further provided is the double-acting hydraulic cylinder 78 from which extends the piston rod 80. The lower end of the cylinder 78 is pivotally connected to the bracket 82 secured to the apron 28 of the main support 20 by means of the pin 84 extended through the boss 86 and the bifurcated cylinder end 88. The piston rod 80 has formed on the outer end thereof the bifurcated end member 90 which is pivotally connected to the boss 92 formed on the main toggle arm 66 by means of the pin 94.

The delimber B also includes the second intermediate arcuate pivoted knife 96 which is substantially rectangular in outline with the cutting teeth 98 formed on the outer edge thereof. Affixed to the underside of the knife 96 is a pair of spaced supports 100 and mounted on the lower ends of the supports is the pin 102. The pin 102 is mounted in the bearing 104 secured to the platform 30. The upper ends of the supports 100 mount the pin 106, and the pin 106 is mounted in the bearing portion 108 mounted on the lower end of the second upper arcuate knife 110 to thereby pivotally mount the knife 110. The knife 110 has mounted on the outer edge thereof the teeth 112.

The central stationary knife 34 has formed on the side edge adjacent the knife 96 the protrusion 112 which fits into the notch 114 formed in the inner end of the second intermediate knife 96 to form a hinge-like connection. The inner end of the intermediate knife 96 is formed with the notch 116 in which a portion of the lower end of the upper arcuate knife 110 is positioned to form a hinge-like connection.

Secured to the bearing 104 and platform 30 and extending therefrom is the stationary pivot mount 118. The numeral 120 designates a first main toggle arm pivoted at its lower end to the mount 118 by means of the pin 122 and at its upper end to the lower end of the second secondary toggle arm 124 by means of the pin 126. The upper end of the secondary toggle arm 124 is pivotally connected to the boss 128 of the upper arcuate knife 110 by means of the pin 129. Further provided is the double-acting hydraulic cylinder 130 from which extends the piston rod 132. The lower end of the cylinder 130 is pivotally connected to the extrusion 131 of the main support 20 by means of the pin 134 extended through the boss 136 and the bifurcated cylinder end 138.

The piston rod 132 has formed on the outer end thereof the bifurcated end member 140 which is pivotally connected to the boss 142 formed on the main toggle arm 120 by means of the pin 144. The operation of the delimber B by means of the hydraulic system shown will be hereinafter explained.

DRIVE ROLLERS

Figures 8, 9:
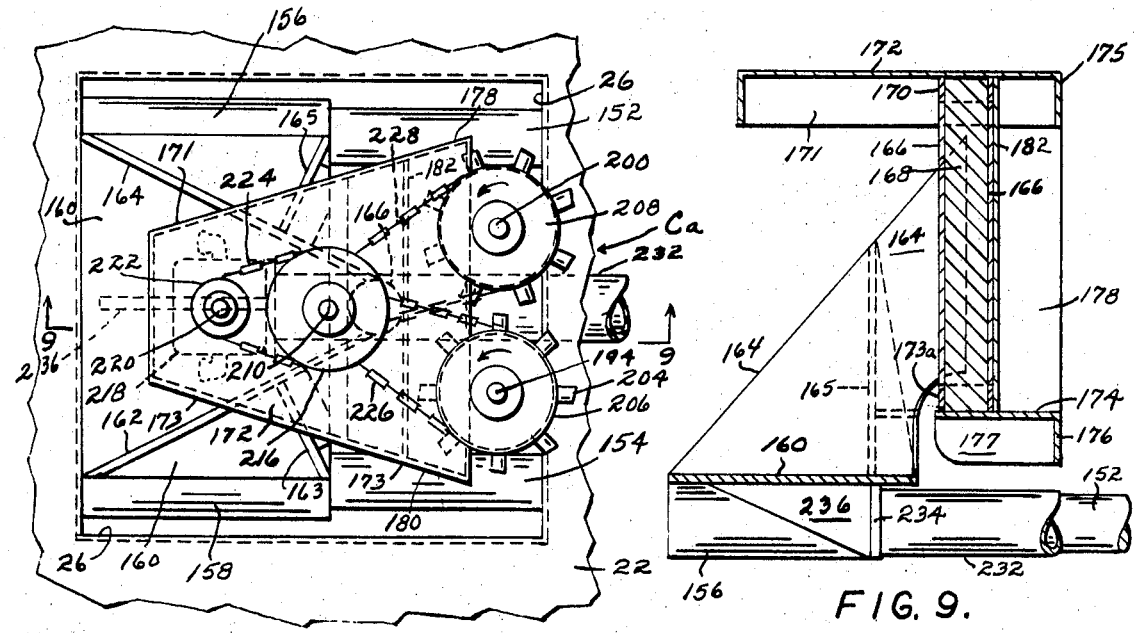
FIG. 8 is a top plan view of the drive rollers of FIGS. 6 and 7.
FIG. 9 is a sectional view on the line 9—9 of FIG. 8 showing the pivot for the drive rollers, the drive rollers not shown.
Figures 6, 7:
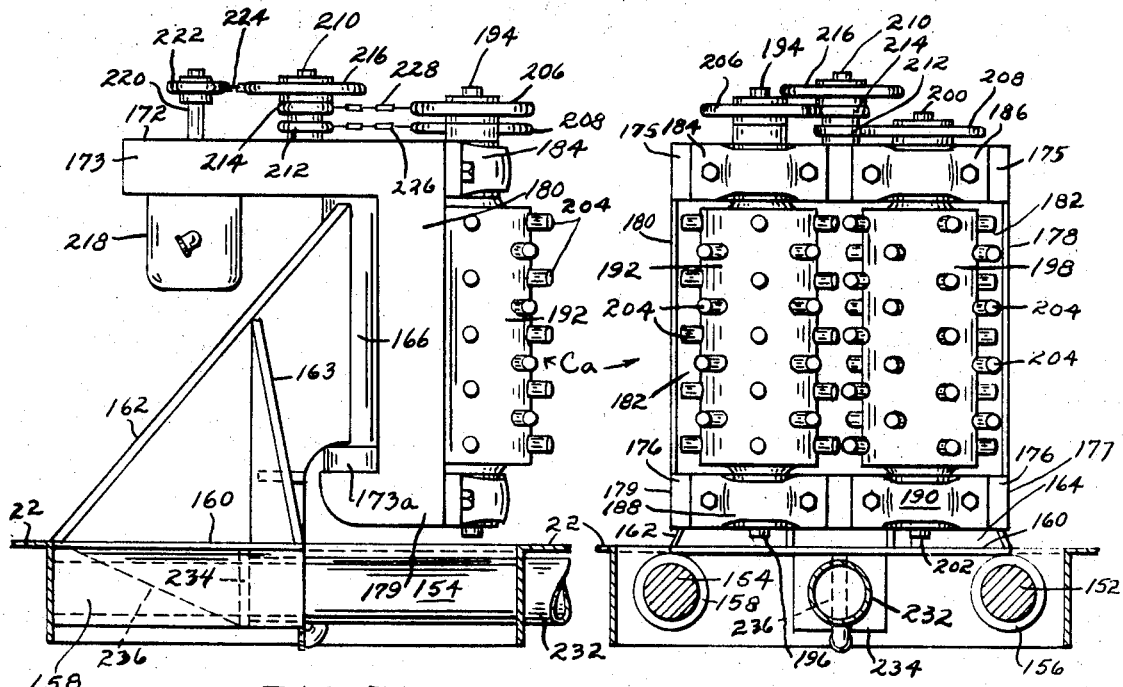
FIG. 6 is a view on the line 6—6 of FIG. 1 with a portion of the main base in section.
FIG. 7 is a view on the line 7—7 of FIG. 1.

With particular reference to FIGS. 1, and 6-9 the dual drive roller unit C which moves a felled tree through the delimber and to the shear unit D hereinafter described includes the first rectangular opening 26 formed in the platform 22. The first drive roller unit Ca includes the pair of spaced rods 152 and 154 which are secured to the underside of the platform 22, and slidably mounted on the rod 152 is the sleeve 156. Slidably mounted on the rod 154 is the sleeve 158. The numeral 160 designates a plate secured at its edges to the sleeves 156 and 158. Secured to plate 160 is the first vertical support plate 162 and the second vertical support 164 which converge toward each other at the inner edges. The plate 162 is braced by the auxiliary support plate 163 and the plate 164 is braced by the auviliary support plate 165. The inner edge of the support 162 is secured to the stationary vertical tubular bearing 166 in which is mounted the pivot shaft 168. The upper end of the shaft 168 is mounted in and secured to the collar 170 which is secured to the underside of the upper plate support 172. The upper end of the pivot shaft 168 is secured to the underside of the plate 172. The plate 172 is formed with the depending side flanges 171 and 173 and the inner transverse flange 175. The lower end of the shaft 168 is positioned in the collar 173a secured to lower plate 174.

The lower end of the shaft 168 is secured to the plate 174. The plate 174 has formed thereon the inner depending flange 176 and the side flanges 177 and 179. Secured to the flange 171 is the narrow vertical support wall 178, and secured to the flange 173 is the narrow vertical support wall 180. The numeral 182 (FIGS. 6, 8 and 9) designates an integral bracing wall secured at its outer edges to the narrow support wall 178 and the narrow support wall 180. Further provided is the first upper bearing 184 secured to the flange 175 and the second upper bearing 186 also secured to the flange 175. Secured to the flange 176 of plate 174 is the first lower bearing 188 in vertical alignment with first upper bearing 184 and also secured to the flange 176 is the second lower bearing 190 in vertical alignment with second upper bearing 186.

The roller unit Ca includes a first rotatable gripper cyliner 192 forming the roller which is formed with a stub shaft 194 at the upper end and a stub shaft 196 at the lower end. The stub shaft 194 is mounted in the first upper bearing 184, and the stub shaft 196 is mounted in the lower bearing 188. A second rotatable gripper cylinder 198 forming the roller is provided for the unit Ca which is formed with a stub shaft 200 at the upper end and a stub shaft 202 at the lower end. The stub shaft 200 is mounted in the second upper bearing 186, and the stub shaft 202 is mounted in the second lower bearing 190. Each of the cylinders 192 and 198 has formed on the outer surface thereof the projections 204 to aid in providing a positive gripping and driving of the tree.

The stub shaft 194 of the gripper roller cylinder 192 has secured thereon the sprocket 206, and the stub shaft 200 of the gripper roller cylinder 198 has secured thereon the sprocket 208. A driven shaft 210 is also provided which is rotatably mounted on the plate 172 by means of conventional bearings (not shown). Mounted on the shaft 210 is the lower sprocket 212, the intermediate sprocket 214 and the upper sprocket 216. The numeral 218 designates a hydraulic motor secured to the underside of the plate 172 with the shaft 220 thereof extending above the plate. Mounted on the shaft 220 is the sprocket 222, and positioned on the sprocket 222 is the chain 224 which is also positioned on the sprocket 216 thereby allowing a driving of shaft 210. As the shaft 210 is driven the sprocket 212 thereon drives the sprocket 208 through chain 226, and the sprocket 214 drives the sprocket 206 through chain 228.

It will be seen that the gripper roller cylinders 192 and 198 are rotated in the same direction and move within the opening 26 as a unit by means of the sleeves 156 and 158 sliding on the rods 152 and 154, respectively. Further, the unit Ca pivots on the shaft 168.

Further provided is the second driver roller unit Cb which is substantially identical to the first drive roller unit Ca. The unit Cb is slidably movable in the rectangular opening 24 formed in the platform 22 and identical to opening 26. Some of the portions of unit Cb that are identical to the unit Ca are indicated by the same reference numerals accompanied by the lower case letter a. The unit Cb is in juxtaposition to unit Ca and operates in the same manner. In addition, the units Ca and Cb slide or drift in a pre-set position in unison on the sleeves 156 and 158 mounted on the rods 152 and 154, and the units are moved together or apart by means of a mechanism including the central double-acting hydraulic cylinder 232 secured at its inner end to the small transverse plate 235 secured to the underside of the plate 160 and braced by the gusset 236 secured to the underside of the plate 160 and the plate 235. Mounted within the cynder 232 is the piston 238 which is connected the piston rod 240 that extends from the cylinder and is connected at its opposite end to the small transverse plate 242 identical to small plate 235, the plate 242 connected to the underside of plate 160a of unit Cb. When hydraulic pressure is introduced into central cylinder 232 and upon the head of piston 238 the units Ca and Cb are separated, and when hydraulic pressure is introduced upon the opposite side of the piston or rod side thereof, the units Ca and Cb are drawn together whereby the same will grip a tree placed therebetween.

The units Ca and Cb are drawn together with pressure engagement pre-set upon a log therebetween. A relief valve is provided in the hydraulic system so that if the gripper roller cylinders 192 and 198 encounter a protrusion on a log, for example, the gripper roller units Ca and Cb separate but still maintain the pre-set pressure. It will be seen that the gripper rollers of the units Ca and Cb are rotated in the same direction whereby the tree is moved through the same.

Also if the gripper roller cylinders of units Ca and Cb encounter a depressed area in the log or as the diameter of the log decreases the rollers move together due to a constant maintained hydraulic pressure controlled by the relief valve. Further, the mounting and actuation of the gripper roller cylinders of units Ca and Cb accommodate a crooked log. The hydraulic system for operating the gripper roller cylinders of Ca and Cb is illustrated schematically in FIG. 13.

SHEAR UNIT

The shear unit D is positioned in alignment with the drive roller unit C and the delimber unit B and includes the lower horizontal shaft 244 slidably mounted in a hole 245 extending through the lower end of the upright support 246, FIGS. 10, 11 and 14. The outer end of shaft 244 is threaded and mounts the nut 248 which abuts the support 246. Further provided is the vertical plate 250 secured at the lower edge thereof to the platform 22 by welding and further supported by the braces 252 and 254. The numeral 256 designates a support plate secured to the support 246 the lower straight edges 258 of which forms a guide. The edge 258 of plate 256 slidably rests upon the upper straight edge 260 of plate 250 which supports the upright 246 as part of the shear blade unit.

The upright 250 has formed therein the slot 262 and extending through the slot is the nut-equipped bolt 264 secured to the upright 246 by the nut which allows adjustable slidable movement of the upright 246 on the platform 22 to thereby adjust the horizontal position of the shear blade hereinafter described. The upright 246 is further supported by brace 266 secured at its lower end to the lugs 268 on the platform 22 and formed on the upper end of the brace is the flat end piece 270. Formed in the upper portion of the upright 246 is the slot 272 through which extends the bolt 274 which also extends through a hole in the end piece 270. As a result adjustable slidable movement of the upright 246 is allowed and secured by the nut 276.

Further provided is the upper horizontal shaft 278 slidably mounted in a hole 280 extending through the upper end of the upright support 246, FIG. 14 in particular. The outer end of the shaft 278 is threaded and mounts the positioning nut 282 which abuts the support 246. The numeral 284 designates a restainer which includes the semicircular inner end piece 286 which is positioned on the shaft 278 and up against the inner edge of the upright support 246. Secured to each side of the end piece 286 are the parallelly disposed and spaced side bars 288 and 290 connected at the outer ends by the end bar 292. The end bar is formed with a threaded hole which receives the bolt 294, the inner end of the bolt abutting the outer end of the shaft 278. The retainer 284 and the nut 282 provides for an adjustable positioning of the upright support 246 upon the shaft 278 which adjustably controls the position of the shear blade hereinafter defined on the shaft 278. The upright support 246 is positioned on the shaft 278 by first positioning the nut 282 on the shaft and against the support. The bolt 294 is then tightened against the end of the shaft 278 which draws the half collar member 286 against the upright which in turn is forced against the positioning nut 282. As a result the upright support 246 is adjustably secured upon the shaft 278. The support 246 is adjustably secured upon the lower shaft 244 by means of the retainer 284a which is identical to retainer 284 except it is rotated 180° from the position of retainer 284. The portions of retainer 284a that are identical bear the same numeral but are accompanied by a lower case letter a. Thus by adjusting the nut 248 on shaft 244 and the bolt 294a tightened, the half collar bears against the support 246 which in turn bears against the nut 248. This adjustment is done with bolts 264 and 274 loosened.

The numeral 296 designates a first shear blade connected at its upper edge to the sleeve 298 slidably mounted on the upper shaft 278. The lower edge of the blade 296 is connected to the sleeve 300 slidably mounted on the lower shaft 244. Further provided is the first shear hydraulic cylinder 302 anchored at its outer end to the upright support 246 by means of the pin 304 extended through holes in the support 246 and a hole in the flange 306 formed on the end of the cylinder 302 and extending into a recess formed in the support 246. The cylinder has extended therefrom the piston rod 308 on the outer end of which is formed the bifurcated end member 310. The end member 310 receives the blade 296 and is secured thereto by means of the pin 312 secured in holes in the member 310 and a hole formed in the blade 296. The blade 296 is formed with the V-cutting edge 314.

The numeral 316 designates a second shear blade connected at its upper edge to the sleeve 318 slidably mounted on the upper shaft 278. The lower edge of the shear blade 316 is connected to the sleeve 320 slidably mounted on the lower shaft 244. Also provided is the second shear cylinder 322 anchored at its outer end to the upright support 324 by means of the pin 326 extended through holes in the support 324 and a hole in the flange 328 formed on the end of the cylinder 322 and extending into a recess formed in the support 324. The blade 316 is formed with the V-cutting edge 330.

The hydraulic cylinder has extended therefrom the piston rod 332 on the outer end of which is formed the bifurcated end member 334. The end member 334 receives the blade 316 and is secured thereto by means of the pin 336 secured in holes in the member 334 and a hole through the blade 316. It will be seen that with the shear blades 296 and 316 connected to the sleeves aforementioned and slidable on the shafts 214 and 278 that the blades will at all times be held in rigid alignment even though under extreme pressure upon the tree to be cut. The lower shaft 244 is supported centrally by means of the support 338 connected thereto and to the apron 340 of the platform 22.

The shear unit is operated by means of the hydraulic system illustrated schematically in FIG. 13. The numeral 342 designates a collar which is freely and slidably mounted on the upper shaft 278 and which acts as a floating stop for the opposed sleeves 298 and 318. The thickness of the stop 342 determines the proximity of the cutting edge 314 of the blade 296 to the cutting edge 330 of the blade 316 when the blades are closed. The practice has been to have the cutting edges 314 and 330 just meet at the extent of the inward travel thereof.

The lower end of the support 324 is slidably supported on the platform 22 by means identical to that with regard to the lower end of support 246 and adjustable by means identical to that with regard to support 246, the identical parts bearing the same reference numerals accompanied by a lower case letter b. The upper end of the support 324 is slidable and adjustable by means identical to that with regard to support 246, the identical parts bearing the same reference numerals accompanied by a lower case letter c.

With the shear unit disclosed both blades are slidable on round rods which provides positive and rigid positioning of the slidable blades.

Secured to the top surface of platform 22 at a point between the delimber unit B and the gripper rollers of unit C is the arcuate projection 346, FIG. 1, which maintains the felled tree raised slightly off the surface of the platfrom whereby the gripper rollers can adequately grip the delimbed tree.

FIG. 13 is a schematic view of the hydraulic system of the device including the valve 348 for tne shear blade hydraulic cylinders 302 and 322 together with the valve 350 for the delimber hydraulic cylinders 78 and 130, the valve 352 for the central hydraulic cylinder 232, and the valve 356 for the hydraulic gripper motors 218 and 218a. FIG. 13 also illustrates the pump P and the tanks T, Ta and Tb included in the hydraulic system. Further provided are the relief valves Ra, Rb, Rc and Rd.

In conclusion and with regard to the drive rollers Ca and Cb the same are slidably mounted on the round rods 152 and 154 which provides rigid slidable movement. The mounting also allows the gripper roller units Ca and Cb to float, that is, slide free while tensioned upon a tree. Further the units Ca and Cb pivot which allows equal drive force tension of all four rollers upon a tree. Further, the units Ca and Cb pivot which allows equal drive force tension of all four rolers upon a tree. Further, the units Ca and Cb allow the simple and easy dropping of the base or lower portion of a tree between the open roller units to start the operation thereby requiring no precise positioning of the tree for moving of the tree.

OPERATION OF THE DEVICE

The delimber B is operated by introducing hydraulic pressure to the lower ends of the cylinders 78 and 130 to open the delimber and introducing hydraulic pressure to the lower ends of the cylinders 78 and 130 to close the delimber members upon a tree placed thereon. In charging the cylinders 78 and 130 at the lower ends the members of the delimber D are caused to move from the positions of FIG. 2 to that of FIG. 3 and upon a tree placed upon the delimber B through the action of the main toggle arms 66 and 120, and the secondray toggle arms 70 and 124 together with the connection mechanisms heretofore described. The toggle arms provide a positive and effective engagement with a tree placed within the same. The felled tree is so placed in the device A initially that the lower trunk end thereof is between the gripper roller cylinders of units Ca and Cb while at the same time the upper portion of the tree is within the delimber B.

The gripper roller unit Ca and the gripper roller unit Cb are moved toward each other in unison by the hydraulic means shown and in pressure engagement upon a tree placed between the gripper rollers. The gripper rollers are then rotated which draws the tree through the knives of the delimber B thereby removing the limbs therefrom. At the same time the operation of the rollers moves a tree to a position between the open blades 258 and 278 of the shear unit. When the desired portion of the tree is beyond the blades, the blades are brought together by the hydraulic means illustrated to cut off the desired length of the tree.

The gripper rollers may be continuously operated to thereby delimb further portions of the tree and as a desired length of tree is passed by the gripper rollers to a point beyond the cutting blades, the blades are again operated to cut a further section of the tree.

Many trees have protrusions of various natures thereon or may be crooked. When the protrusions or crooked portions of a tree are moved through the gripper roller units Ca and Cb the inequalities of the tree are taken up by the features that the units Ca and Cb are slidable in unison upon the rods 152 and 154, each of the units Ca and Cb is pivotable and the units Ca and Cb separate to a degree due to the relief valves provided in the hydraulic system thereof, but still maintaining a present pressure which continues to move the tree. As the tree is moved through the delimber, the diameter of the tree decreases, but constant pressure of the knives is maintained upon the tree as the diameter reduces due to the hydraulic system and the relief valves therein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A device for processing a felled tree into desired lengths comprising in combination:
   (a) support means,
   (b) means mounted on said support means for cutting limbs from a felled tree,
   (c) means for cutting a felled tree into lengths after being delimbed mounted on said support means in alignment with said limb cutting means,
   (d) means positioned on said support means intermediate of and in alignment with said limb cutting means and said tree cutting means for gripping and moving a felled tree through said limb cutting means and to said tree cutting means for cutting thereby,
   (e) said means for gripping and moving a felled tree including a first roller means having a fixed vertical axis and
   (f) a second roller means in juxtaposition to said first roller means and having a fixed vertical axis parallel to and spaced from the axis of said first roller means, and
   (g) means between and connecting said first and second roller means for causing relative movement between said first and second roller means for separation to receive a tree lowered into position between the same and allowing movement of the roller means together in gripping engagement with a tree.

2. The device of claim 1 in which said means for causing relative movement between the first and second roller means and allowing movement of the roller means together in gripping engagement with a tree includes
   (a) a hydraulic cylinder positioned between said first and second roller means and connected at one end to said first roller means,
   (b) a piston rod connected at one end to said second roller means and having a piston on the other end positioned in said cylinder, and
   (c) means for creating and releasing fluid pressure on both sides of said piston.

3. The device of claim 2 in which each of said roller means is pivotally mounted on said support means.

4. The device of claim 3 in which said means for causing and allowing relative movement between the first and second roller means and movement together includes
   (a) sleeves mounted on said roller means, said sleeves mounted on,
   (b) parallely disposed rods mounted on said support means.

5. The device of claim 1 in which each of said roller means is pivotally mounted on said support means.

6. The device of claim 5 in which said means for causing and allowing relative movement between said first and second roller means and movement together includes
   (a) sleeves mounted on said roller means, said sleeves mounted on,
   (b) rods mounted on said support means.

7. The device of claim 1 in which said tree cutting means includes
   (a) first and second cutting blades having parallely disposed cutting edges and
   (b) means slidably mounting said blades on said support means including upper and lower parallely disposed spaced rods,
   (c) first and second supports connected to each end of each of said rods,
   (d) sleeves slidably mounted on each of said rods, the outer ends of said blades connected to said sleeves, (e) a first hydraulic ram connected to said first blade and said first support centrally thereof, and
(f) a second hydraulic rim connected to said second blade and said second support centrally thereof.

References Cited

UNITED STATES PATENTS

| | | | |
|---|---|---|---|
| 693,188 | 2/1902 | Thomas | 144—246 |
| 3,074,446 | 1/1963 | Earl | 144—3 |
| 3,183,951 | 5/1965 | Larson | 144—3 |
| 3,236,274 | 2/1966 | Eynon | 144—3 |
| 3,351,107 | 11/1967 | Hamilton | 144—2 |
| 3,376,907 | 4/1968 | McNeal | 144—34 |
| 3,398,774 | 8/1968 | Hahn | 144—309 |
| 3,491,811 | 1/1970 | Larson et al. | 144—3 |

FOREIGN PATENTS

| | | | |
|---|---|---|---|
| 529,975 | 9/1956 | Canada | 144—34 |

GERALD A. DOST, Primary Examiner

U.S. Cl. X.R.

83—623; 144—2, 246